US010278001B2

United States Patent
Edry et al.

(10) Patent No.: US 10,278,001 B2
(45) Date of Patent: Apr. 30, 2019

(54) MULTIPLE LISTENER CLOUD RENDER WITH ENHANCED INSTANT REPLAY

(71) Applicant: MICROSOFT TECHNOLOGY LICENSING, LLC, Redmond, WA (US)

(72) Inventors: Philip Andrew Edry, Seattle, WA (US); Todd Ryun Manion, Seattle, WA (US); Robert Norman Heitkamp, Sammamish, WA (US); Steven Marcel Elza Wilssens, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/594,390

(22) Filed: May 12, 2017

(65) Prior Publication Data

US 2018/0332422 A1    Nov. 15, 2018

(51) Int. Cl.
*G06F 17/00* (2006.01)
*H04S 7/00* (2006.01)
(Continued)

(52) U.S. Cl.
CPC ............ *H04S 7/303* (2013.01); *A63F 13/525* (2014.09); *A63F 13/86* (2014.09); *G06F 3/165* (2013.01); *G06T 15/20* (2013.01); *G11B 20/10527* (2013.01); *G11B 27/005* (2013.01); *H04N 21/233* (2013.01); *H04N 21/23418* (2013.01); *A63F 2300/538* (2013.01); *A63F 2300/6063* (2013.01); *A63F 2300/6607* (2013.01); *A63F 2300/6661* (2013.01);
(Continued)

(58) Field of Classification Search
CPC ... G06F 3/165; H04S 2400/11; H04S 2420/22
See application file for complete search history.

(56) References Cited

U.S. PATENT DOCUMENTS 7,124,425 B1   10/2006  Anderson, Jr. et al.
7,657,920 B2    2/2010  Arseneau et al.
(Continued)

OTHER PUBLICATIONS

Batke, et al., "Spatial Audio Processing for Interactive TV Services", In Proceedings of Audio Engineering Society Convention, May 13, 2011, 11 pages.
(Continued)

*Primary Examiner* — Joseph Saunders, Jr.
(74) *Attorney, Agent, or Firm* — Newport IP, LLC; Scott Y. Shigeta

(57) ABSTRACT

The techniques disclosed herein provide a high fidelity, rich, and engaging experience for spectators of streaming video services. The techniques disclosed herein enable a system to receive, process and, store session data defining activity of a virtual reality environment. The system can generate recorded video data of the session activity along with rendered spatial audio data, e.g., render the spatial audio in the cloud, for streaming of the video data and rendered spatial audio data to one or more computers. The video data and rendered spatial audio data can provide high fidelity video clips of salient activity of a virtual reality environment. In one illustrative example, the system can automatically create a video from one or more camera positions and audio data that corresponds to the camera positions.

19 Claims, 12 Drawing Sheets

(51) Int. Cl.
    *G06T 15/20*     (2011.01)
    *G06F 3/16*     (2006.01)
    *G11B 20/10*     (2006.01)
    *G11B 27/00*     (2006.01)
    *H04N 21/233*     (2011.01)
    *H04N 21/234*     (2011.01)
    *A63F 13/86*     (2014.01)
    *A63F 13/525*     (2014.01)

(52) U.S. Cl.
    CPC . *G11B 2020/10546* (2013.01); *H04S 2400/11* (2013.01); *H04S 2420/11* (2013.01)

(56) References Cited

U.S. PATENT DOCUMENTS

| | | | |
|---|---|---|---|
| 7,725,073 | B2 | 5/2010 | Anderson, Jr. et al. |
| 8,239,910 | B2 | 8/2012 | Anderson, Jr. et al. |
| 9,185,361 | B2 | 11/2015 | Curry |
| 9,196,238 | B2 | 11/2015 | Inha et al. |
| 9,432,720 | B2 | 8/2016 | Kruglick |
| 9,616,338 | B1 | 4/2017 | Hooper et al. |
| 2014/0038708 | A1* | 2/2014 | Davison .................. A63F 13/12 463/31 |
| 2014/0094302 | A1* | 4/2014 | Wilkiewicz ............. A63F 13/00 463/31 |
| 2014/0320662 | A1 | 10/2014 | Mcnamee et al. |
| 2014/0364208 | A1 | 12/2014 | Perry |
| 2014/0364228 | A1* | 12/2014 | Rimon .................... A63F 13/12 463/32 |
| 2015/0055929 | A1 | 2/2015 | Van hoff et al. |
| 2016/0182799 | A1 | 6/2016 | Laaksonen et al. |
| 2017/0157512 | A1* | 6/2017 | Long ..................... A63F 13/497 |
| 2017/0347219 | A1* | 11/2017 | McCauley .............. H04S 7/304 |

OTHER PUBLICATIONS

Perez, Sarah, "Youtube Rolls Out Support for 360-Degree Live Streams and Spatial Audio", https://techcrunch.com/2016/04/18/youtube-rolls-out-support-for-360-degree-live-streams-and-spatial-audio/, Published on: Apr. 18, 2016, 7 pages.

"International Search Report and Written Opinion Issued in PCT Application No. PCT/US2018/028767", dated Jul. 17, 2018, 10 Pages.

* cited by examiner

MULTIPLE LISTENER CLOUD RENDER WITH ENHANCED INSTANT REPLAY

BACKGROUND

Some streaming video platforms, such as Twitch, provide services that focus on video gaming, including playthroughs of video games, broadcasts of eSports competitions, and other events. Such platforms also share creative content, and more recently, music broadcasts. In some existing systems, there are two types of users: participants and spectators. Participants of the system can control aspects of a session defining an event. For example, data defining a session can enable participants to control avatars in a virtual reality environment and enable the participation in tournaments, games, or other forms of competition. The participants can interact with objects in the virtual reality environment, including objects controlled by other participants, etc. Content of such events can either be streamed to spectators in real time or via video on demand from a recording of activity.

Although existing systems can enable a large number of spectators to watch the activity of participants of a session, some existing systems have a number of drawbacks. For instance, some existing systems provide a poor quality audio output to the spectators. In some cases, participants of a session may have a high quality, three-dimensional audio output, while the spectators may only receive a diluted version, or an identical copy, of the participant's audio stream. In addition, some systems only provide video streams from a limited number of fixed camera positions or a participant's perspective. Such systems can cause spectators to be unengaged, as the spectators have a limited number of options in terms of what they can see and hear.

It is with respect to these and other considerations that the disclosure made herein is presented.

SUMMARY

The techniques disclosed herein provide a high fidelity, rich, and engaging experience for spectators of video platforms. The techniques disclosed herein enable a system to receive, process and, store session data defining activity of a virtual reality environment. The system can generate recorded video data of session activity along with rendered spatial audio data, e.g., render the spatial audio in the cloud, for streaming of the video data and rendered spatial audio data to one or more computers. The video data and rendered spatial audio data can provide high fidelity video clips of salient activity of a virtual reality environment. In one illustrative example, the system can automatically create a video from one or more camera positions and audio data that corresponds to the camera positions. The system can generate customized scenes by selecting a location and a direction of a virtual camera perspective, e.g., a selected viewpoint. The viewpoint of the scenes can be automatically generated by an analysis of the session data, wherein the viewpoint can capture salient activity based on one or more criteria. A camera perspective can automatically "follow the action" from selected viewpoints and customize audio that corresponds to the location and direction of the selected viewpoints.

A generated video can be from a perspective following a customized path through a series of events, such as activity of a video game session. The video can be streamed to users, such as a number of spectators of a streaming video platform, and each user can experience customized audio that corresponds to selected viewpoint perspectives. In some embodiments, the system can generate an Ambisonics-based rendering that follows the perspective of the selected viewpoints.

The data that is generated by, stored at, and communicated from the system can include portions of object-based audio of a game session. The system can also generate, store and communicate output data defining coordinates of a camera path. The system can also generate, store, and communicate video data showing automatically selected camera views and spatial audio corresponding to the selected camera views. During playback, media data, such as a video/audio file can be generated in real time as a playback device follows the camera path and renders the audio output from the portions of the object-based audio. When the system generates the audio for the captured camera path, the generated audio output can be based on an Ambisonics-based output.

In addition to generating an audio output based on an Ambisonics-based technology, in some configurations, the techniques disclosed herein can generate an audio output based on other technologies including a channel-based technology and/or an object-based technology. Based on such technologies, audio streams associated with individual virtual objects can be rendered from any position and from any selected viewing area.

When the system generates an Ambisonics-based audio output, such an output can be communicated to a number of client computing devices. In some configurations, a server can render the audio output in accordance with the selected camera perspective orientation and communicate the output to one or more client computing devices. When the virtual camera perspective is rotated, the system can utilize a model of audio objects defined in the audio output. The rotation can be based on data defining the camera perspective, e.g., a direction within a virtual environment. The system can then cause a rendering of an audio output that is consistent with the virtual camera's orientation. Although other technologies can be used, such as an object-based technology, configurations utilizing the Ambisonics technology may provide additional performance benefits given that an audio output based on the Ambisonics technology can be rotated after the fact, e.g., after the audio output has been generated.

The techniques disclosed herein enable spectators to observe recorded events and/or live events streaming in real time. Having such capabilities, a system can enable a system to produce an instant replay of salient activity. For instance, when an instant replay is desired, spectators or the system can provide an input to initiate a playback of recorded data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
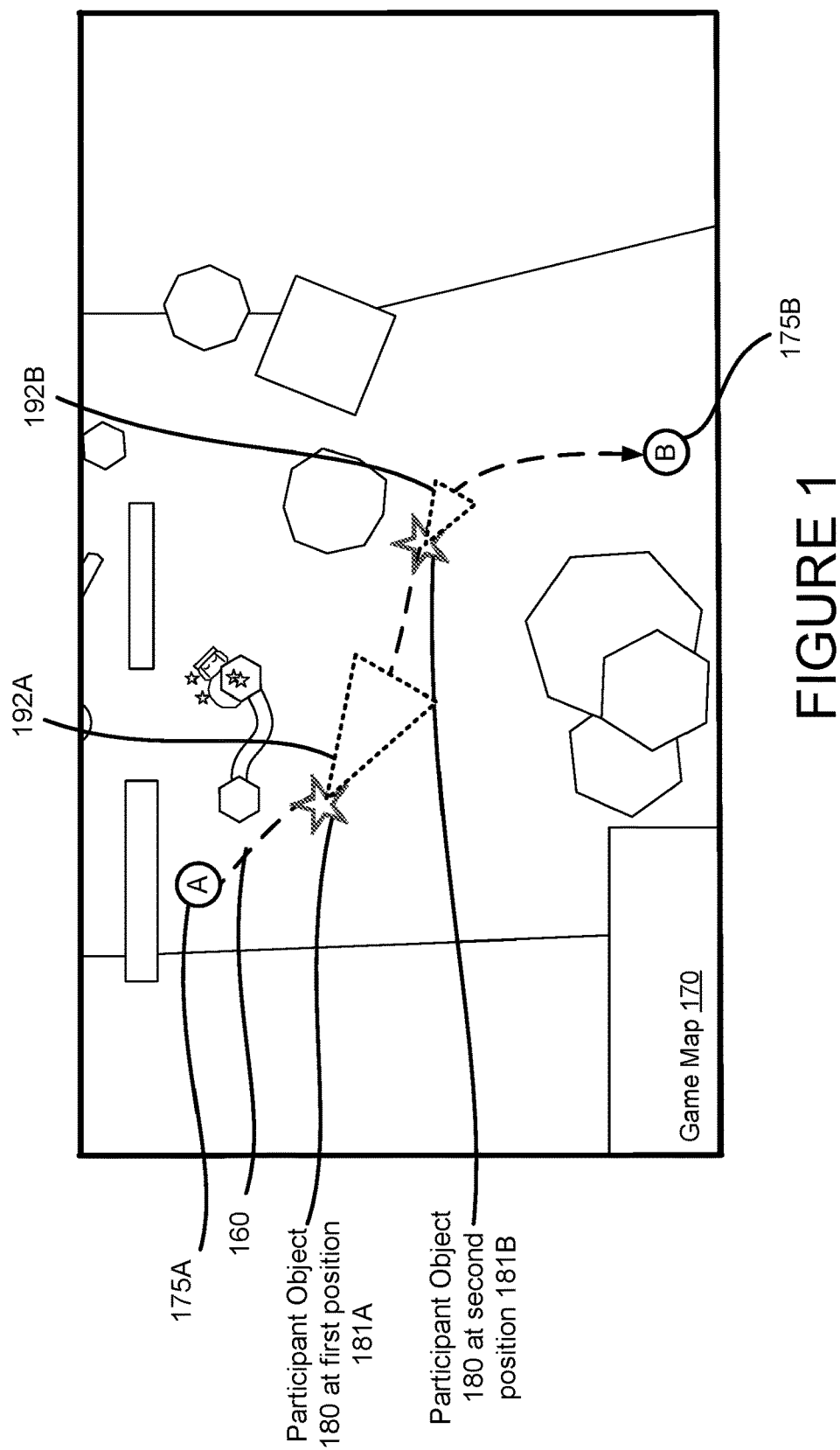
FIG. 1 is an example user interface showing a top view of a virtual reality environment including a participant object.

The techniques disclosed herein provide a high fidelity, rich, and engaging experience for spectators of streaming video services. In some configurations, a system can receive or generate session data defining a virtual reality environment comprising a participant object. The session data can allow a participant to provide a participant input for controlling a location of the participant object and a direction of the participant object. A participant object, for example, can include an avatar, vehicle, or other virtual reality object associated with a user.

A system can analyze the session data to determine a level of activity associated with the participant object or another virtual reality object. In some configurations, the system can also analyze the session data to determine a type of activity associated with the participant object or another virtual reality object. The system can then select a location and a direction of a virtual camera perspective based on the level of activity and/or the activity type associated with the participant object or another object. For illustrative purposes, the virtual camera perspective is also referred to herein as a "virtual camera viewing area." Data defining the perspective can include a two-dimensional or a three-dimensional area of a virtual environment where virtual objects, such as an avatar or a boundary, within the perspective are deemed as visible to a virtual reality object, such as a participant object. The virtual camera perspective can be from a first-person perspective of a participant object or the virtual camera perspective can be from a third-person perspective.

The system can then generate an output file comprising video data having images from the location and direction of the virtual camera perspective. The output file further comprises audio data for causing an output device to emanate an audio output from a speaker object location that is selected based on the location of the virtual camera perspective, wherein the audio output emanating from the speaker object location models the location and direction of the of the virtual camera perspective.

In some configurations, the system generates an audio output based on the Ambisonics technology. In some configurations, the techniques disclosed herein can generate an audio output based on other technologies including a channel-based technology and/or an object-based technology. Based on such technologies, audio streams associated with individual objects can be rendered from any position and from any viewing direction by the use of the audio output.

When the system generates an Ambisonics-based audio output, such an output can be communicated to a number of client computing devices. In some configurations, a server can render the audio output in accordance with the selected camera perspective orientation and communicate the output to one or more client computing devices. The client computing device can rotate a model of audio objects defined in the audio output. The system can cause a rendering of an audio output that is consistent with the spectator's new orientation. Although other technologies can be used, such as an object-based technology, configurations utilizing the Ambisonics technology may provide additional performance benefits given that an audio output based on the Ambisonics technology can be rotated after the fact, e.g., after the audio output has been generated.

As summarized above, one or more systems can utilize session data defining a virtual reality environment comprising a participant object, the session data allowing a participant to provide a participant input for controlling a location of the participant object and a direction of the participant object. For illustrative purposes, aspects of a virtual reality environment are shown in FIG. 1 and FIG. 2.

FIG. 1 illustrates a top view of a rendering of a game map 170 that is based on session data. In this illustrative example, a participant object 180 is traveling down a path 160 from a first point 175A to a second point 175B. This illustrative example shows the participant object 180 at a first position 181A having a first perspective 192A. This example also shows the participant object 180 at a second position 181B having a second perspective 192B. The participant object 180 can interact with a number of virtual objects, some of which are shown in this example as hexagons and rectangles.

Figure 2:
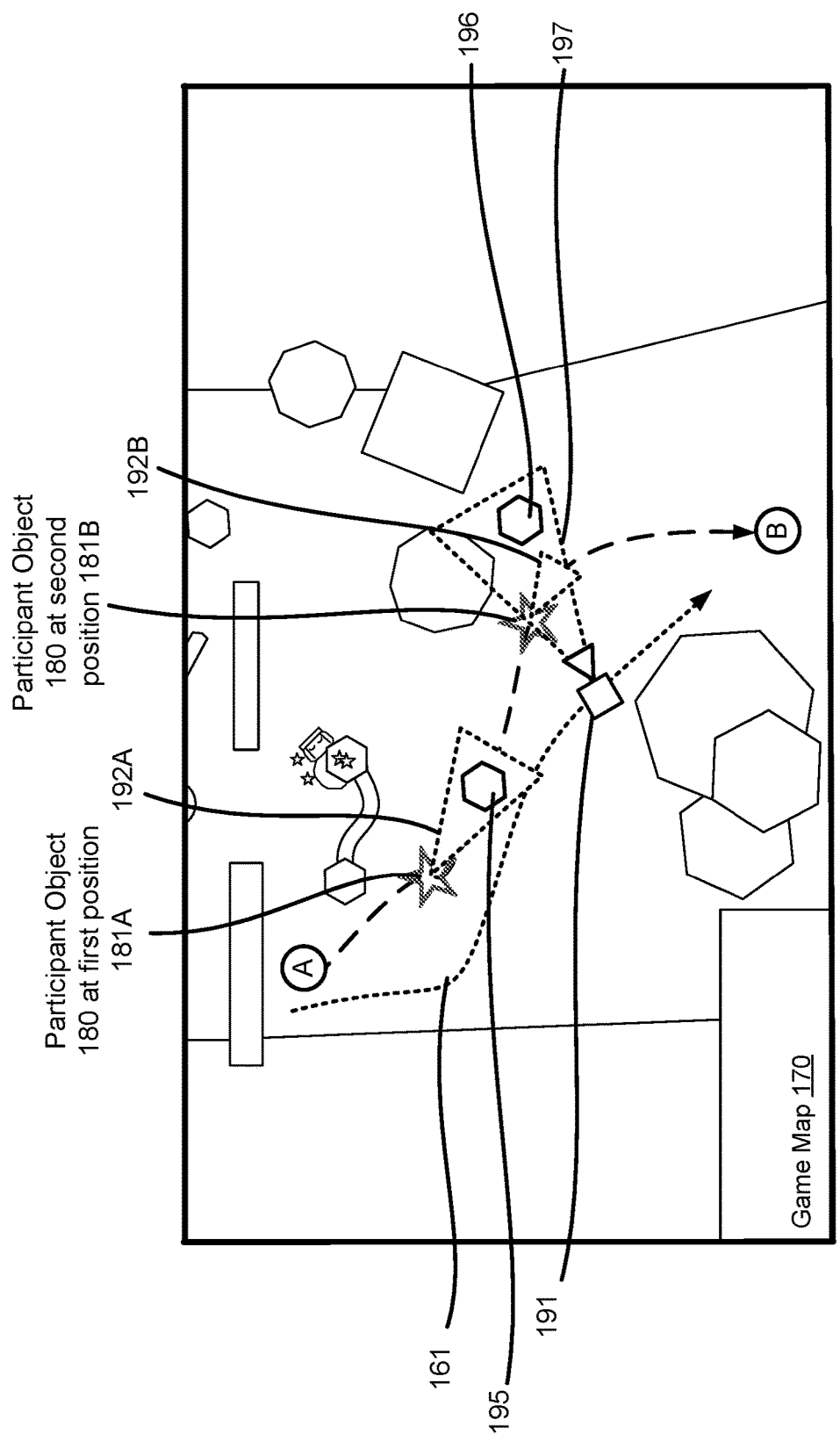
FIG. 2 is an example user interface showing the top view of the virtual reality environment showing a path of a virtual camera perspective.

FIG. 2 illustrates a top view of the game map 170 showing a virtual camera 191 having a virtual camera perspective 197. In addition, the game map 170 shown in FIG. 2 comprises virtual objects within the perspective 192, e.g., viewing area, of the participant object 180. More particularly, a first virtual object 195 is within the first perspective 192A when the participant object 180 is at the first position 181A. A second virtual object 196 is not within the second perspective 192B when the participant object 180 is at the second position 181B. However, the virtual object 196 is within the virtual camera perspective 197 of the virtual camera 191.

In some configurations, the virtual camera 191 can follow a camera path 161 that follows the path 160 of the participant object 180. Video data can be recorded from the perspective 192 of the participant object 180 or from the perspective 197 of the virtual camera 191. The location of the virtual camera 191, and thus the virtual camera perspective 197, can be within a threshold distance from the path 160 of the participant object 180. The threshold distance, for example, can be any suitable distance for capturing multiple objects having a threshold level of activity or a threshold level of interaction within the virtual camera perspective 197.

In some configurations, the video data can be generated from a first-person perspective projecting from the location of the participant object 180 when virtual objects within the first-person perspective have a threshold level of activity. For example, when the first object 195 as a threshold level of activity, such as a certain amount of movement or a particular change in a state, the system may select the perspective 192A of the participant object 184 for recording video data.

In some configurations, the video data can be generated from a third-person perspective 197 directed toward the participant object 180 and a virtual object 196 when the participant object 180 has a threshold level of activity or a threshold level of interaction with the virtual object 196. For example, in an example where the participant object 180 is an avatar in the avatar is interacting with another virtual object 196, such as a virtual weapon or a virtual tool, a selected camera angle for the video data may be arranged to record video data depicting the participant object interacting with the virtual object.

In some configurations, the system can analyze and compare a level of activity with respect to each virtual object in a virtual environment. Video data can then be generated to include the virtual object having a greater level of activity. For example, as shown in FIG. 2, a system can analyze the session data to determine a level of activity associated with one or more virtual objects. The virtual camera perspective generating video data can be a first-person perspective 192A projecting from the location 181A of the participant object 180 when the level of activity of one or more virtual objects, such as object 195 within the first-person perspective 192A is greater than the activity level of the participant object 180.

In some configurations, the virtual camera perspective used for generating video data can be a third-person perspective 197 directed toward the participant object 180 when the participant object 180 has a threshold level of activity. For instance, if the participant object 180 is moving at a threshold velocity or is moving in a particular manner, also referred to herein as a type of activity, the system may select the third-person perspective 197 for generating video data.

In some configurations, the virtual camera perspective used for generating video data can toggle between the first-person perspective 192B and a third-person perspective 197 based on one or more time periods. Such techniques enable periodic switching between different perspectives.

In some configurations, the virtual camera perspective used for generating video data can be based on a type of activity. For example, the virtual camera perspective can be a first-person perspective 192A projecting from the location 181A of the participant object 180 when a first type of activity is detected, and the virtual camera perspective is a third-person perspective 197 directed toward the participant object 180 when a second type of activity is detected. In some illustrative examples, the first type of activity can include, but is not limited to, a category of moves, a type of movement, a gesture, an interaction between objects, etc. More specific examples of a first type of activity may include movement of a player in a predetermined direction, e.g., forward, backward, left, or right. A first type of activity may include a turning motion. A second type of activity can also include but is not limited to, a category of moves, a type of movement, a gesture, an interaction between objects, etc. More specific examples of a second type of activity may include a player, e.g., the participant object, operating a weapon or tool in association with another virtual object, jumping over anther virtual object, etc.

Figure 3A:
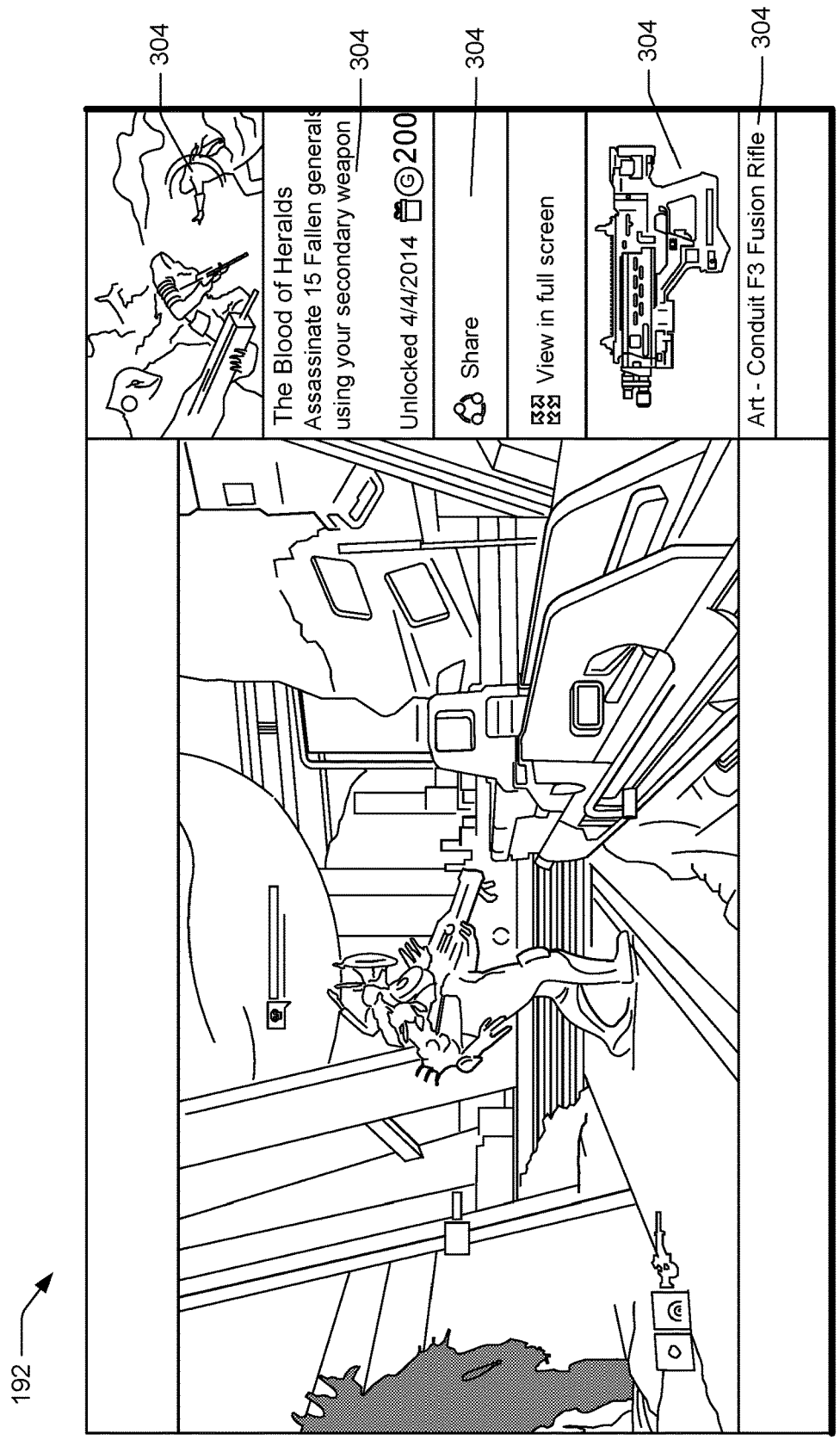
FIG. 3A is an example user interface showing a first-person perspective of an image captured by a virtual camera.
Figure 3B:
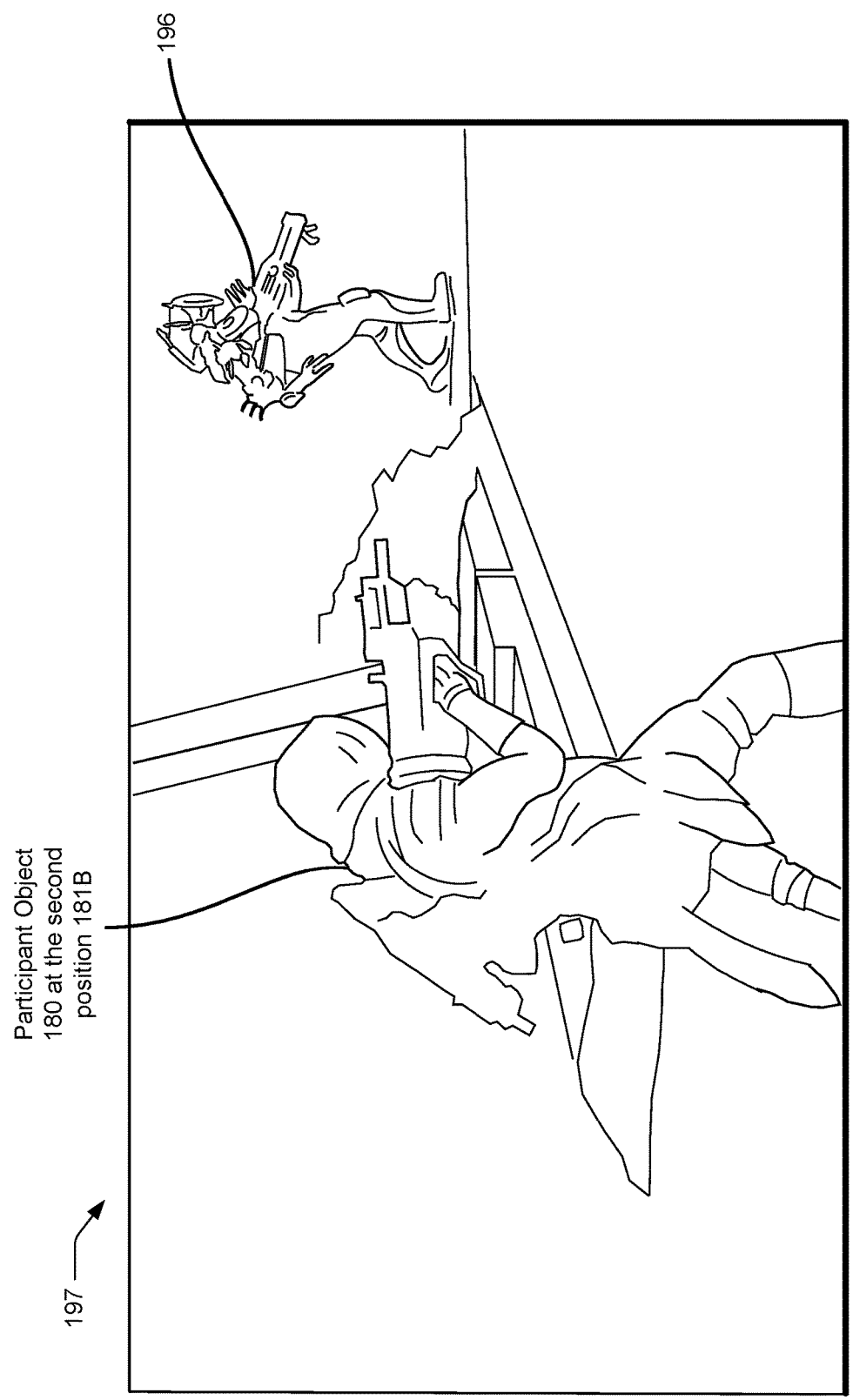
FIG. 3B is an example user interface showing a third-person perspective of an image captured by a virtual camera.

FIG. 3A is an example user interface showing a rendering of a first-person perspective 192 from video data captured by a virtual camera. As shown, the interface of the first-person perspective 192 can include one or more virtual objects. Also shown, the user interface can include graphical elements 304 indicating contextual information regarding the session. For instance, a system can receive the contextual information from a client device controlled by a participant, and renderings of the contextual information can be integrated into the generated video data. FIG. 3B is an example user interface showing a rendering of a third-person perspective 197 from video data captured by a virtual camera. As shown, the interface of the third-person perspective 197 can include one or more virtual objects, including the participant object 180 and a virtual object 196.

As summarized above, media data, such as a video file can be generated to enable a playback device to play a video having sound that follows selected camera perspectives and renders an audio output from the portions of the object-based audio. The system can generate an output file comprising video data having images from the location and direction of the virtual camera perspective, wherein the output file further comprises audio data for causing an output device to emanate an audio output from a speaker object location that is selected based on the location of the virtual camera perspective, wherein the audio output emanating from the speaker object location models the location and direction of the of the virtual camera perspective. FIGS. 4-9 illustrate such features in more detail.

Figure 4:
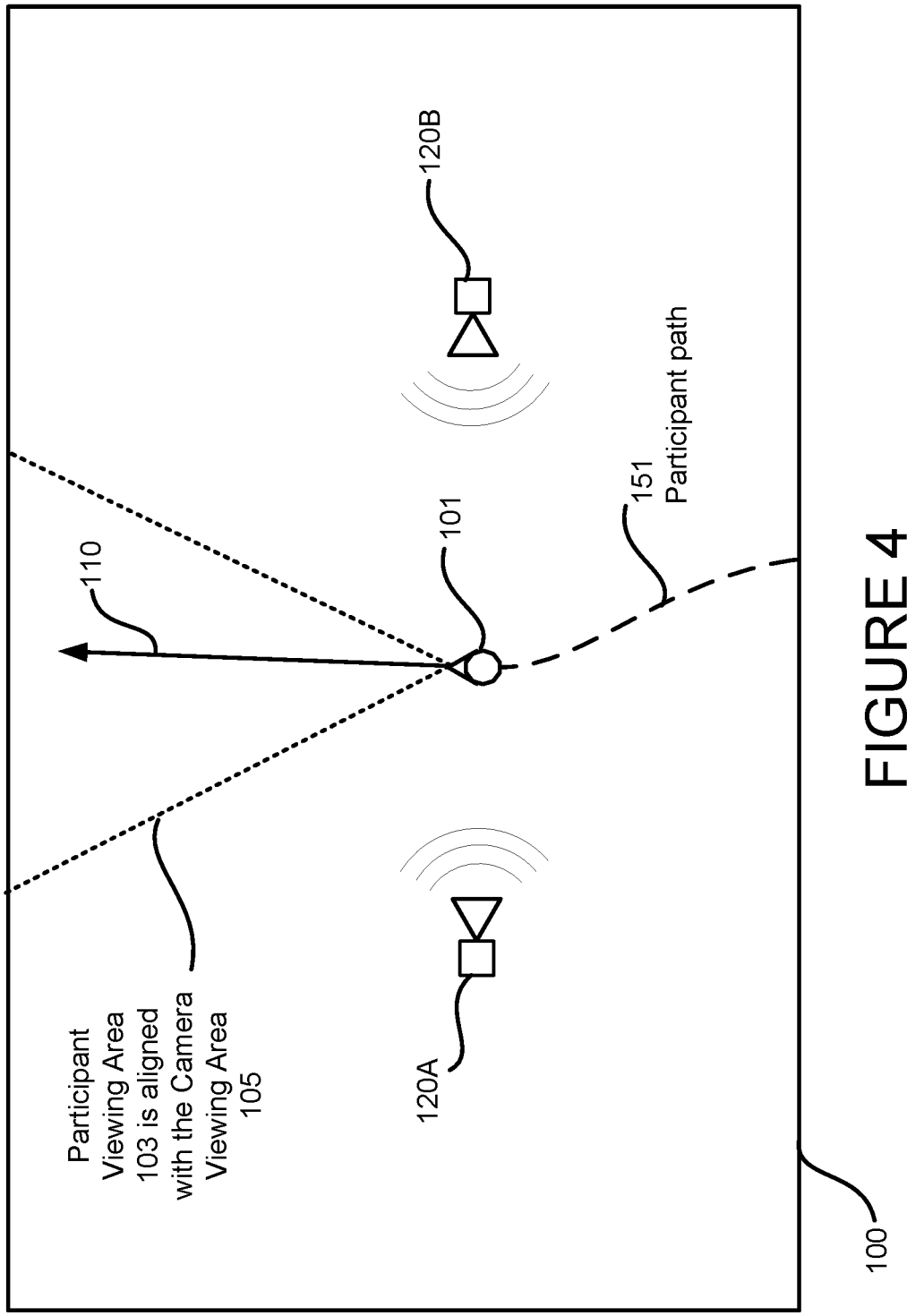
FIG. 4 is an example user interface showing a participant viewing area that is aligned with a virtual camera viewing area.

FIG. 4 illustrates a scenario where a computer is managing a virtual reality environment that is displayed on a user interface 100. The virtual reality environment comprises a participant object 101, also referred to herein as an "avatar," that is controlled by a participant. The participant object 101 is moving through the virtual reality environment following a path 151. A system provides a participant viewing area 103 and a camera viewing area 105, also referred to herein as a virtual camera perspective 197. In this example, the participant viewing area 103 is aligned with the camera viewing area 105. More specifically, the participant object 101 is pointing in a first direction 110 and the camera viewing area 105 is also pointing in the first direction 110. In this scenario, data defining the camera viewing area 105 is communicated to computing devices associated with spectators for the display of objects in the virtual reality environment that fall within the camera viewing area 105. Similarly, the computing device associated with the participant displays objects in the virtual reality environment that fall within the viewing area 103.

Also shown in FIG. 4, within the virtual reality environment, a first audio object 120A and a second audio object 120B (collectively referred to herein as audio objects 120) are respectively positioned on the left and the right side of the participant object 101. In such an example, data defining the location of the first audio object 120A can cause a system to render an audio signal of a stream that indicates the location of the first audio object 120A. In addition, data defining the location of the second audio object 120B would cause a system to render an audio signal that indicates the location of the second audio object 120B. More specifically, in this example, the participant and the spectator of the generated video would both hear the stream associated with the first audio object 120A emanating from a speaker on their left. The participant and the spectator would also hear the stream associated with the second audio object 120B emanating from a speaker on their right.

In some configurations, data indicating the direction of a stream can be used to influence how a stream is rendered to a speaker. For instance, in FIG. 4, the stream associated with the second audio object 120B could be directed away from the participant object 101, and in such a scenario, an output of a speaker may include effects, such as an echoing effect or a reverb effect to indicate that direction.

Figure 5:
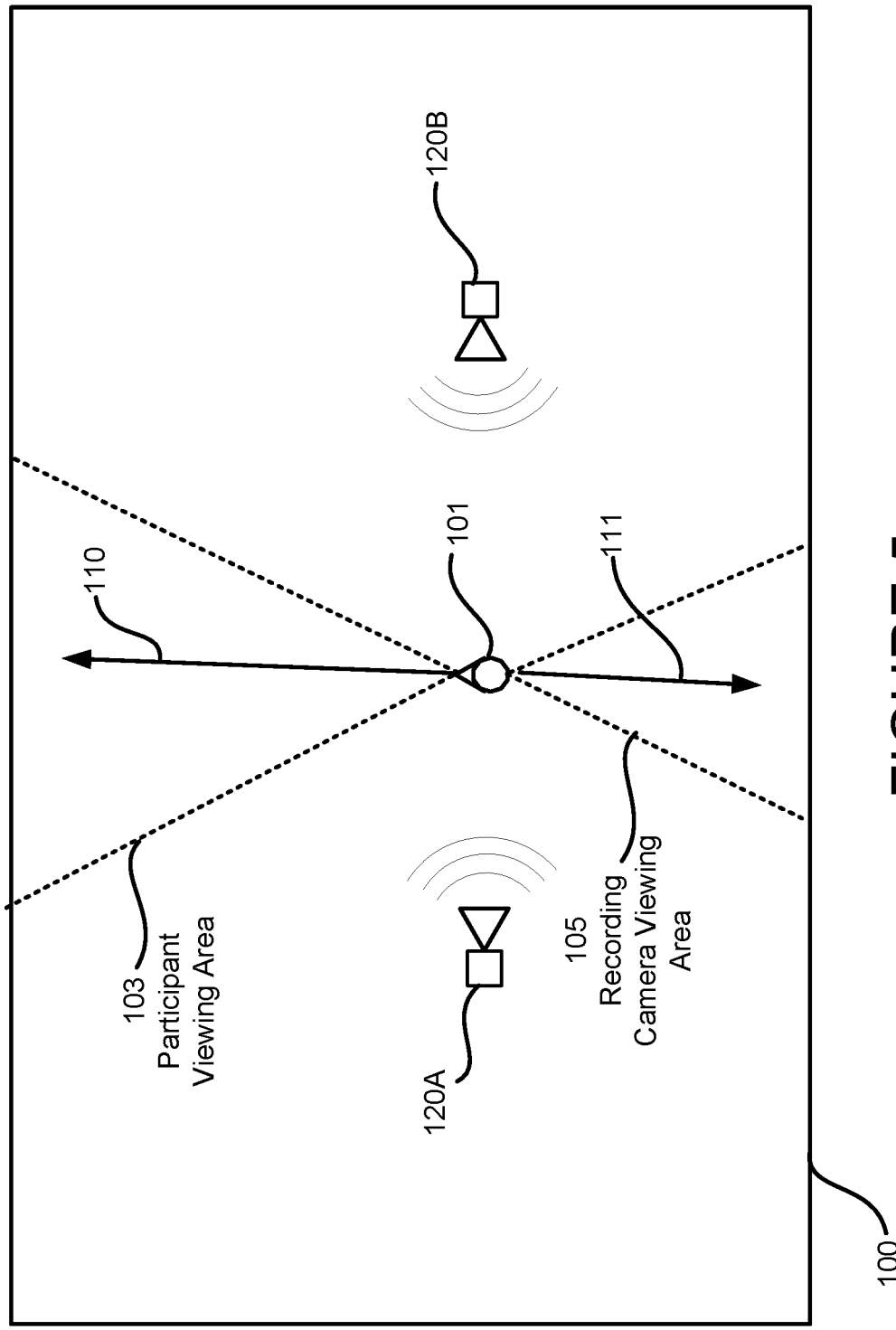
FIG. 5 is an example user interface showing a virtual camera viewing area that is rotated from a participant viewing area.

Referring now to FIG. 5, consider a scenario where the camera viewing area 105 has rotated towards a second direction 111. In this example, the second direction 111 is 180 degrees from the participant viewing area 103. In this scenario, the computing device associated with the spectator would display objects in a virtual reality environment that fall within the camera viewing area 105. The computing device associated with the participant would independently display objects in a virtual reality environment that fall within the participant viewing area 103.

In addition, the system can generate a spectator audio output data comprising streams associated with the audio objects 120. The spectator audio output data can cause an output device to emanate audio of the stream from a speaker object location positioned relative to the spectator, where the speaker object location models the direction of the spectator view and the location of the audio object 120 relative to the location of the participant object. Specific to the example shown in FIG. 5, when the system selects a virtual camera direction that is rotated, e.g., the direction of the camera viewing area 105 has changed, the spectator of the video would hear the stream associated with the first audio object 120A emanating from a speaker on the right side of the spectator. In addition, the spectator would hear the stream associated with the second audio object 120B emanating from a speaker on the left side of the spectator.

Figure 6:
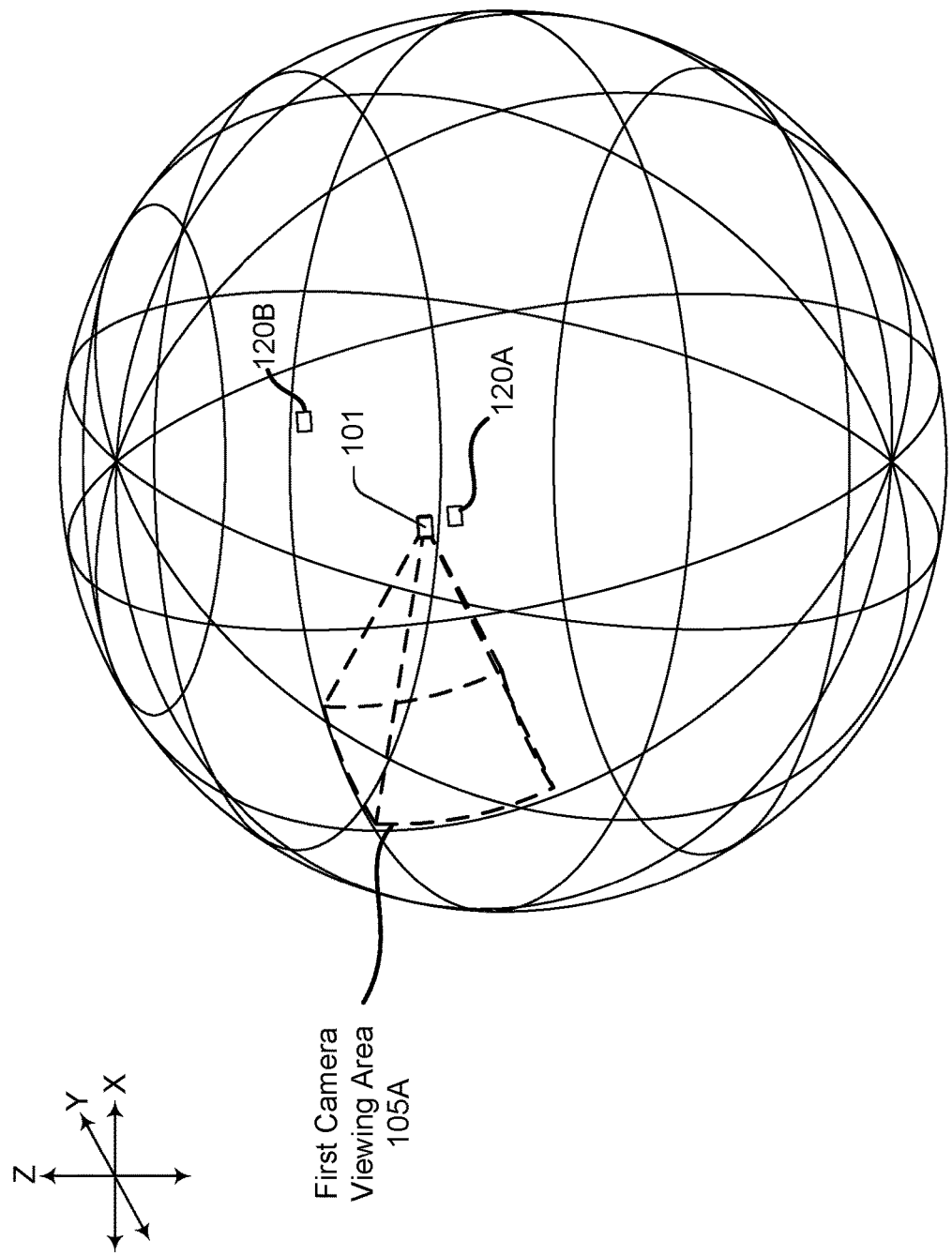
FIG. 6 shows a three-dimensional model showing a virtual camera viewing area relative to audio objects of a virtual reality environment.

Although the example shown in FIG. 4 and FIG. 5 illustrates a two-dimensional representation of a virtual reality environment, it can be appreciated that the techniques disclosed herein can apply to a three-dimensional environment. Thus, a rotation of a viewing area for the participant or the spectator can have a vertical component as well as a horizontal component. FIG. 6 illustrates aspects of such configurations. In the example of FIG. 6, a first direction of a camera viewing area 105 is shown relative to a first audio object 120A in a second audio object 120B. Similar to the example described above, in this arrangement, the spectator of the video that is based on the viewing area 105 would hear streams associated with the first audio object 120A emanating from a speaker on his/her left, and streams associated with the second audio object 120B emanating from a speaker on his/her right.

Figure 7:
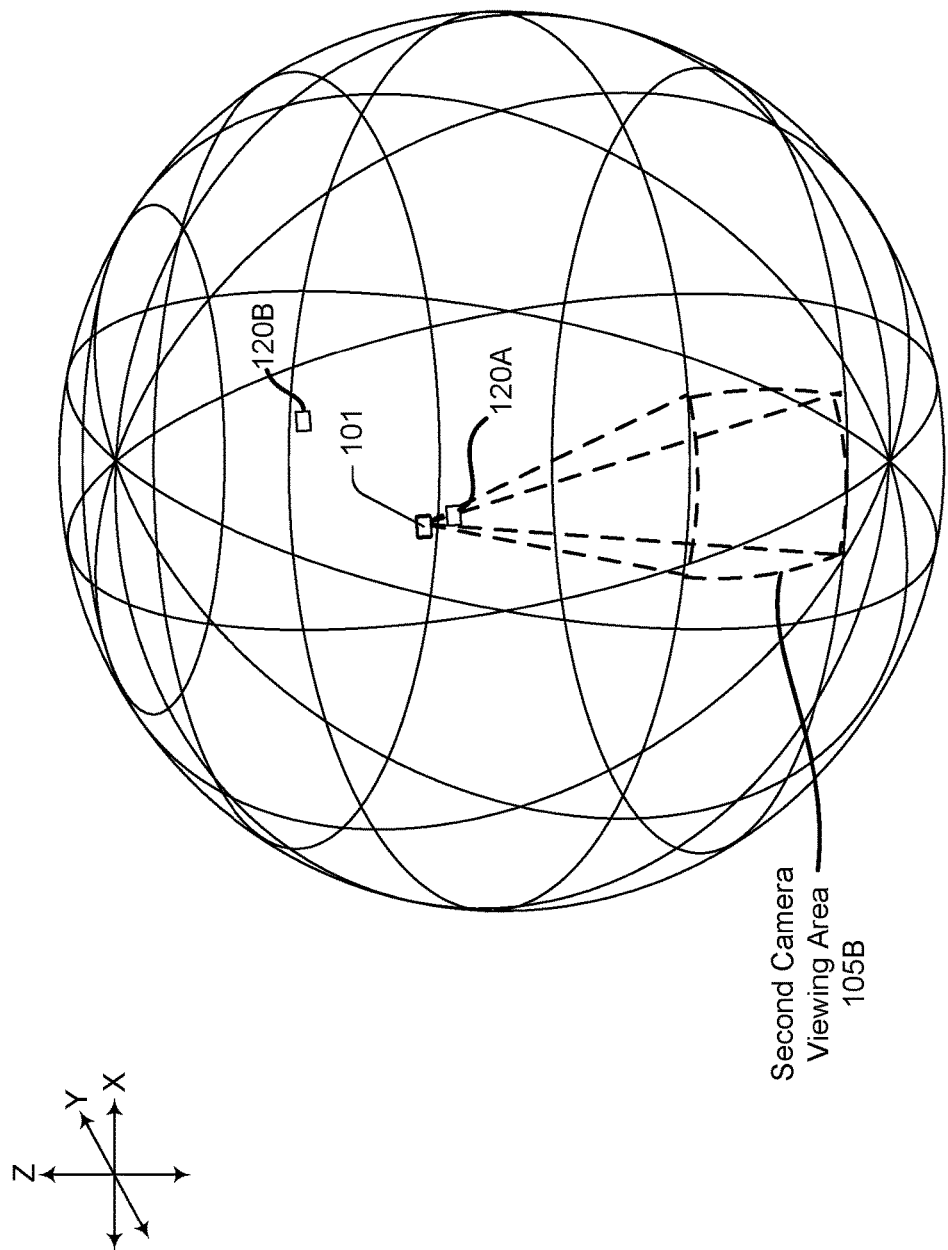
FIG. 7 shows the three-dimensional model of FIG. 6 showing the virtual camera viewing area after it is rotated.

Now turning to FIG. 7, consider a scenario where the system rotates the camera viewing area 105 both in a horizontal direction and vertical direction. As shown, a second direction of the camera viewing area 105B is shown relative to a first audio object 120A in a second audio object 120B. Given this example rotation, the spectator of the video would hear streams associated with the first audio object 120A emanating from a location that is located in front of him/her and slightly overhead. In addition, the spectator would hear streams associated with the second audio object 120B emanating from a location that is located behind him/her.

Figure 8:
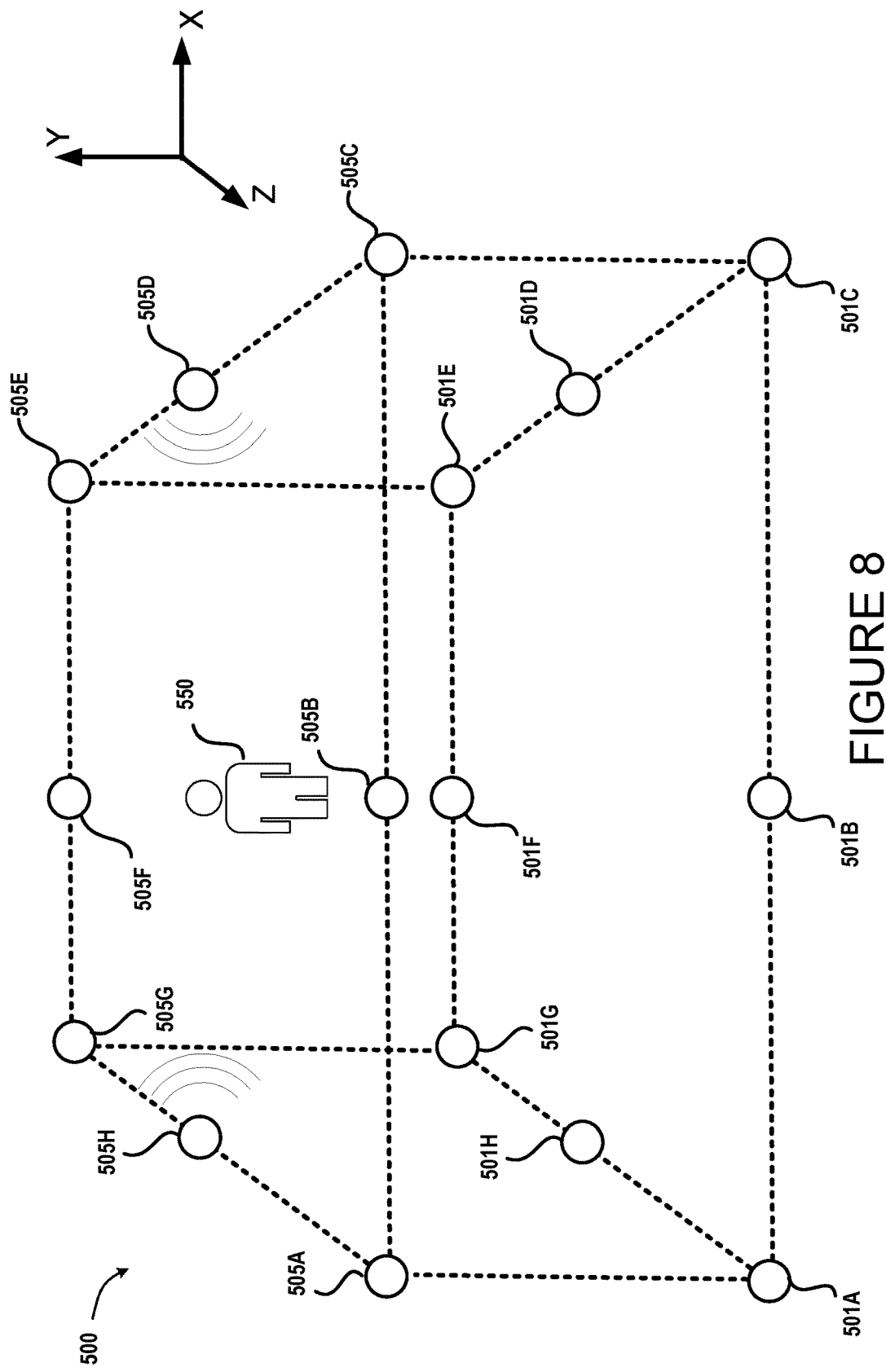
FIG. 8 shows an example of speaker objects used to illustrate features of the present disclosure.

FIG. 8 illustrates a model 500 having a plurality of speaker objects 501-505 (501A-501H, 505A-505H). Each speaker object is associated with a particular location within a three-dimensional area relative to a user, such as a participant or spectator. For example, a particular speaker object can have a location designated by an X, Y and Z value. In this example, the model 500 comprises a number of speaker objects 505A-505H positioned around a perimeter of a plane. In this example, the first speaker object 505A is a front-right speaker object, the second speaker object 505B is the front-center speaker, and the third speaker object 505C is the front-left speaker. The other speaker objects 505D-505H include surrounding speaker locations within the plane. The model 500 also comprises a number of speakers 501A-501H positioned below plane. The speaker locations can be based on real, physical speakers positioned by an output device, or the speaker locations can be based on virtual speaker objects that provide an audio output simulating a physical speaker at a predetermined position.

As summarized herein, a system can generate a spectator audio output signal of a stream, wherein the spectator audio output signal causes an output device to emanate an audio output of the stream from a speaker object location positioned relative to the spectator 550. The speaker object location can model the direction of the camera viewing area 105 (a "spectator view") and the location of the audio object 120 relative to the location of the participant object 101. For illustrative purposes, the model 500 is used to illustrate aspects of the example shown in FIG. 2. In such an example, the speaker object 505H can be associated with an audio stream of the first audio object 120A, e.g., on the right side of the spectator. The speaker object 505D can be associated with an audio stream of the second audio object 120B, e.g., on the left side of the spectator.

Figure 9:
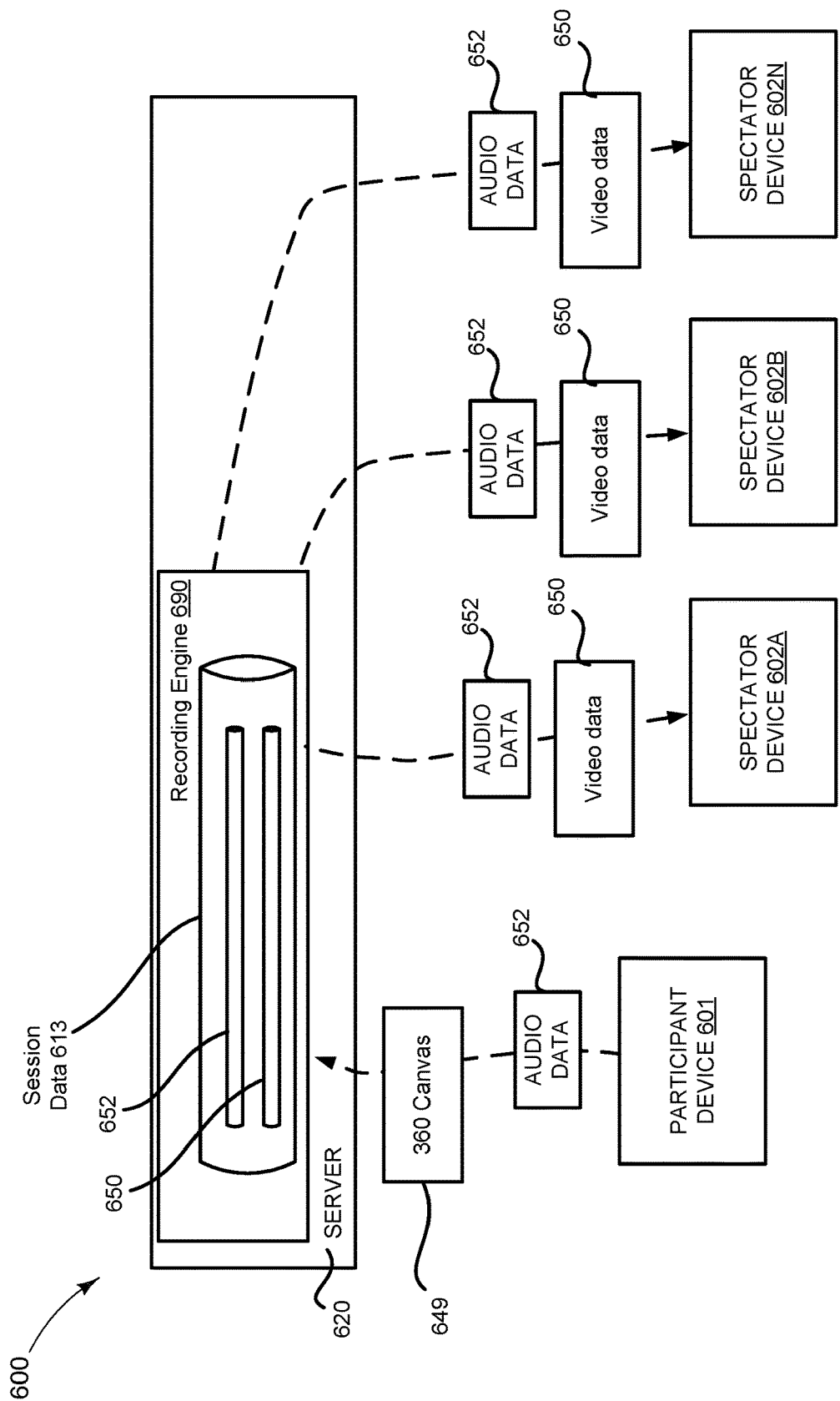
FIG. 9 shows an example system that can be used to implement features of the present disclosure.

FIG. 9 illustrates aspects of a system 600 for implementing the techniques disclosed herein. The system 600 comprises a participant device 601, a plurality of spectator devices 602 (602A up to 602N devices), and a server 620. In this example, the participant device 601, which may be running a gaming application, communicates data defining a 360 canvas 649 and audio data 652 to the server 620. The 360 canvas 649 and audio data 652 can be stored as session data 613 where it can be accessed in real time as the data is generated or accessed after the fact as a recording. A recording can be generated as video data 650 in a manner as described above. For instance, video data 650 can be generated by the can be processed by the recording engine 690 to include scenes from selected virtual camera perspectives. The recording engine 690 can generate audio data 652 that can cause an output device to emanate an audio output from a speaker object location that is selected based on the location of a virtual camera perspective, wherein the audio output emanating from the speaker object location models the location and direction of the of the virtual camera perspective.

In some embodiments, the audio data 652 can comprise an audio signal to the output device in accordance with an Ambisonics-based technology, wherein the output signal defines at least one sound field modeling the location of an audio object associated with a stream, wherein data defining the sound field can be interpreted by one or more computing devices for causing the output device to emanate the audio output based on the stream from the speaker object location.

The video data 650 and audio data 652 can be communicated to the spectator devices 602. Given that the video data 650 and the audio data 652 includes a video of a session, the client computing devices can then play the video and audio and hear sounds from orientations and locations that are consistent with the video that was recorded.

Generally described, output data, e.g., an audio output, based on the Ambisonics technology involves a full-sphere surround sound technique. In addition to the horizontal plane, the output data covers sound sources above and below the listener. Thus, in addition to defining a number of other properties for each stream, each stream is associated with a location defined by a three-dimensional coordinate system.

An audio output based on the Ambisonics technology can contain a speaker-independent representation of a sound field called the B-format, which is configured to be decoded by a listener's (spectator or participant) output device. This configuration allows the system 100 to record data in terms of source directions rather than loudspeaker positions, and offers the listener a considerable degree of flexibility as to the layout and number of speakers used for playback.

Figure 10:
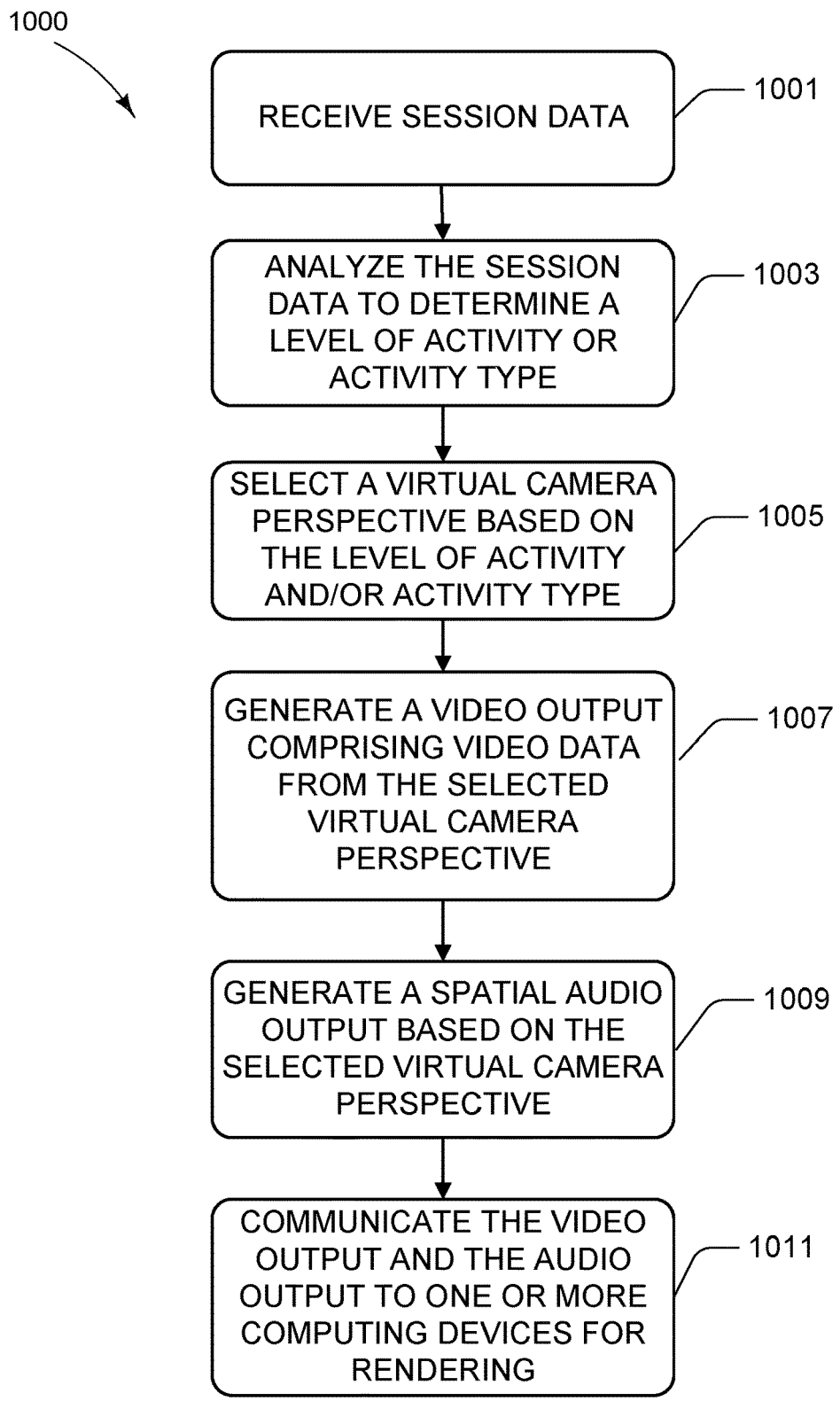
FIG. 10 is a flow diagram showing a routine illustrating aspects of a mechanism disclosed herein for enabling the techniques and technologies presented herein.

Turning now to FIG. 10, aspects of a routine 1000 for providing video data having automatically selected virtual camera positions based on session activity are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1000 are described herein as being implemented, at least in part, by system components, which can comprise an application component and/or a circuit. In some configurations, the system components include a dynamically linked library (DLL), a statically linked library, functionality produced by an application programming interface (API), a compiled program, an interpreted program, a script or any other executable set of instructions. Data, such as the audio data, 360 canvas data and other data, can be stored in a data structure in one or more memory components. Data can be retrieved from the data structure by addressing links or references to the data structure.

Figure 11:
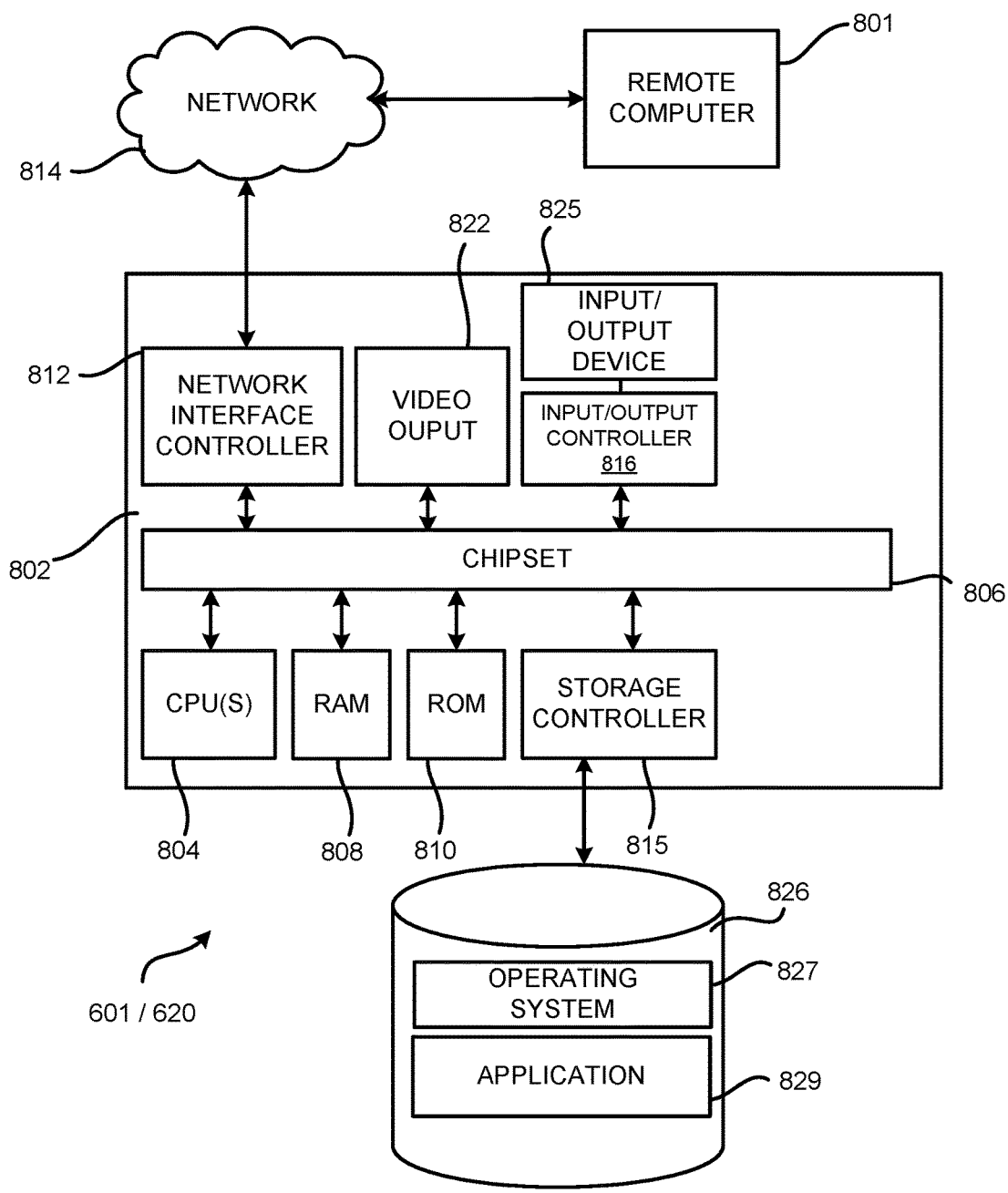
FIG. 11 is a computer architecture diagram illustrating a computing device architecture for a computing device capable of implementing aspects of the techniques and technologies presented herein.

Although the following illustration refers to the components of FIG. 9 and FIG. 11, it can be appreciated that the operations of the routine 1000 may be also implemented in many other ways. For example, the routine 1000 may be implemented, at least in part, by a processor of another remote computer or a local circuit. In addition, one or more of the operations of the routine 1000 may alternatively or additionally be implemented, at least in part, by a chipset working alone or in conjunction with other software modules. Any service, circuit or application suitable for providing the techniques disclosed herein can be used in operations described herein.

With reference to FIG. 10, the routine 1000 begins at operation 1001, where a computing device receive session data defining a virtual reality environment comprising a participant object, the session data allowing a participant to provide a participant input for controlling a location of the participant object and a direction of the participant object. The action of receiving the session data can also mean the session data is generated at the computing device, such as a server. In some configurations, the session data is generated at the participant device and communicated to a remote computer such as the server and/or the spectator computers.

Next, at operation 1003, the computing device analyzes the session data to determine a level of activity or activity type. A summarized herein, activity of one or more virtual objects, such as a participant object, can be analyzed to determine if a virtual object made a particular movement or performed some type of predetermined action.

Next, at operation 1005, the computing device select a virtual camera perspective based on the level of activity and/or activity type. In some configurations, the system can select a first-person perspective or a third-person perspective based on a level of activity and/or an activity type. In one illustrative example, a virtual camera can follow a participant object to capture video footage of salient activity of the participant object. At predetermined times or random times, the virtual camera perspective can toggle between a first-person view and a third-person view. Different types of activity, levels of activity, gestures, or any other action that can take place in a virtual reality environment can cause a computing device to automatically select a particular perspective to capture salient activity.

Next, at operation 1007, the computing device generates a video output comprising video data from the selected virtual camera perspective. The video output can be in the form of a file, a stream, or any other suitable format for communicating video data to one or more computing devices.

Next, at operation 1009, the computing device generates a spatial audio output based on the selected virtual camera perspective. In some configurations, a spatial audio output is based on the direction of the selected camera perspectives, a location of an audio object associated with a stream, and/or the location of the participant object. In some configurations, the spatial audio output can cause an output device (a speaker system or headphones) to emanate an audio output of the stream from a speaker object location positioned relative to the end user, e.g., a spectator. The speaker object location can model the direction of the spectator view and the location of the audio object relative to the location of the participant object.

Next, at operation 1009, the computing device communicates the video output and the audio output to one or more computing devices for rendering. As described herein, the video output (also referred to herein as video data) and the audio output (also referred to herein as audio data) can be communicated from the server to a plurality of client computing devices associated with spectators.

FIG. 11 shows additional details of an example computer architecture for the components shown in FIG. 9 capable of executing the program components described above. The computer architecture shown in FIG. 11 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 11 may be utilized to execute any of the software components described above. Although some of the components described herein are specific to the computing devices 601, it can be appreciated that such components, and other components may be part of any suitable remote computer, such as the server 620.

The computing device 601 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 601.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 601. The chipset 806 may further provide an interface to a computer-readable storage medium such as a read-only memory ("ROM") 810 or non-volatile RAM ("NVRAM") for storing basic routines that help to startup the computing device 601 and to transfer information between the various components and devices. The ROM 810 or NVRAM may also store other software components necessary for the operation of the computing device 601 in accordance with the embodiments described herein.

The computing device 601 may operate in a networked environment using logical connections to remote computing devices and computer systems through a network 814, such as the local area network. The chipset 806 may include functionality for providing network connectivity through a network interface controller (NIC) 812, such as a gigabit Ethernet adapter. The NIC 812 is capable of connecting the computing device 601 to other computing devices over the network. It should be appreciated that multiple NICs 812 may be present in the computing device 601, connecting the computer to other types of networks and remote computer systems. The network allows the computing device 601 to communicate with remote services and servers, such as the remote computer 801. As can be appreciated, the remote computer 801 may host a number of services such as the XBOX LIVE gaming service provided by MICROSOFT CORPORATION of Redmond, Wash. In addition, as described above, the remote computer 801 may mirror and reflect data stored on the computing device 601 and host services that may provide data or processing for the techniques described herein.

The computing device 601 may be connected to a mass storage device 826 that provides non-volatile storage for the computing device. The mass storage device 826 may store system programs, application programs, other program modules, and data, which have been described in greater detail herein. The mass storage device 826 may be connected to the computing device 601 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 601 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 601 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 601 may further read information from the mass storage device 826 by detecting the physical states or characteristics of one or more particular locations within the physical storage units.

In addition to the mass storage device 826 described above, the computing device 601 may have access to other computer-readable media to store and retrieve information, such as program modules, data structures, or other data. Thus, the application 829, other data and other modules are depicted as data and software stored in the mass storage device 826, it should be appreciated that these components and/or other modules may be stored, at least in part, in other computer-readable storage media of the computing device 601. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device 601.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 601. For purposes of the claims, the phrase "computer storage medium," "computer-readable storage medium," and variations thereof, does not include waves or signals per se and/or communication media.

The mass storage device 826 may store an operating system 827 utilized to control the operation of the computing device 601. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 601, such as any of the other software components and data described above. The mass storage device 826 might also store other programs and data not specifically identified herein.

In one embodiment, the mass storage device 826 or other computer-readable storage media is encoded with computer-executable instructions which, when loaded into the computing device 601 or server, transform the computer from a general-purpose computing system into a special-purpose computer capable of implementing the embodiments described herein. These computer-executable instructions transform the computing device 601 by specifying how the CPUs 804 transition between states, as described above. According to one embodiment, the computing device 601 has access to computer-readable storage media storing computer-executable instructions which, when executed by the computing device 601, perform the various routines described above with regard to FIG. 10 and the other FIGURES. The computing device 601 might also include computer-readable storage media for performing any of the other computer-implemented operations described herein.

The computing device 601 may also include one or more input/output controllers 816 for receiving and processing input from a number of input devices, such as a keyboard, a mouse, a microphone, a headset, a touchpad, a touch screen, an electronic stylus, or any other type of input device. Also shown, the input/output controller 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone, a speaker, game controllers and/or audio devices.

For example, the input/output controller 816 can be an encoder and the output device 825 can include a full speaker system having a plurality of speakers. The encoder can use a spatialization technology, such as Dolby Atmos, HRTF or another Ambisonics-based technology, and the encoder can process audio output data or output signals received from the application 829. The encoder can utilize a selected spatialization technology to generate a spatially encoded stream that appropriately renders to the output device 825.

The computing device 601 can process audio signals in a number of audio types, including but not limited to 2D bed audio, 3D bed audio, 3D object audio and audio data Ambisonics-based technology as described herein.

2D bed audio includes channel-based audio, e.g., stereo, Dolby 5.1, etc. 2D bed audio can be generated by software applications and other resources.

3D bed audio includes channel-based audio, where individual channels are associated with objects. For instance, a Dolby 5.1 signal includes multiple channels of audio and each channel can be associated with one or more positions. Metadata can define one or more positions associated with individual channels of a channel-based audio signal. 3D bed audio can be generated by software applications and other resources.

3D object audio can include any form of object-based audio. In general, object-based audio defines objects that are associated with an audio track. For instance, in a movie, a gunshot can be one object and a person's scream can be another object. Each object can also have an associated position. Metadata of the object-based audio enables applications to specify where each sound object originates and how it should move. 3D bed object audio can be generated by software applications and other resources.

Output audio data generated by an application can also define an Ambisonics representation. Some configurations can include generating an Ambisonics representation of a sound field from an audio source signal, such as streams of object-based audio of a video game. The Ambisonics representation can also comprise additional information describing the positions of sound sources, wherein the Ambisonics data can be include definitions of a Higher Order Ambisonics representation.

Higher Order Ambisonics (HOA) offers the advantage of capturing a complete sound field in the vicinity of a specific location in the three-dimensional space, which location is called a 'sweet spot'. Such HOA representation is independent of a specific loudspeaker set-up, in contrast to channel-based techniques like stereo or surround. But this flexibility is at the expense of a decoding process required for playback of the HOA representation on a particular loudspeaker set-up.

HOA is based on the description of the complex amplitudes of the air pressure for individual angular wave numbers k for positions x in the vicinity of a desired listener position, which without loss of generality may be assumed to be the origin of a spherical coordinate system, using a truncated Spherical Harmonics (SH) expansion. The spatial resolution of this representation improves with a growing maximum order N of the expansion.

In addition, or alternatively, a video output 822 may be in communication with the chipset 806 and operate independent of the input/output controllers 816. It will be appreciated that the computing device 601 may not include all of the components shown in the figures, may include other components that are not explicitly shown in FIG. 11, or may utilize an architecture completely different than that shown in FIG. 11.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
a processor;
a memory having computer-executable instructions stored thereupon which, when executed by the processor, cause the computing device to
receive session data defining a virtual reality environment comprising a participant object, the session data allowing a participant to provide a participant input for controlling a location of the participant object and a direction of the participant object,
analyze the session data to determine a level of activity associated with the participant object,
determine a level of activity associated with one or more virtual objects,
select a location and a direction of a virtual camera perspective, wherein the virtual camera perspective is a first-person perspective projecting from the location of the participant object, wherein the direction is towards the one or more virtual objects when the level of activity of one or more virtual objects is greater than the activity level of the participant object, and
generate an output file comprising video data having images from the location and direction of the virtual camera perspective, wherein the output file further comprises audio data for causing an output device to emanate an audio output from a speaker object location that is selected based on the location of the virtual camera perspective, wherein the audio output emanating from the speaker object location models the location and direction of the virtual camera perspective.

2. The computing device of claim 1, wherein the location of the virtual camera perspective is within a threshold distance from a path of the participant object.

3. The computing device of claim 1, wherein the virtual camera perspective is a first-person perspective projecting from the location of the participant object when virtual objects within the first-person perspective have a threshold level of activity.

4. The computing device of claim 1, wherein the virtual camera perspective is a third-person perspective directed toward the participant object and a virtual object when the participant object has a threshold level of activity with the virtual object.

5. The computing device of claim 1, wherein the virtual camera perspective is a third-person perspective directed toward the participant object when the participant object has a threshold level of activity.

6. The computing device of claim 1, wherein the virtual camera perspective toggles between a first-person perspective and a third-person perspective based on one or more time periods.

7. The computing device of claim 1, wherein generating the audio output comprises configuring an audio signal to the output device in accordance with an Ambisonics-based technology, wherein the output signal defines at least one sound field modeling the location of an audio object associated with a stream, wherein data defining the sound field can be interpreted by one or more computing devices for causing the output device to emanate the audio output based on the stream from the speaker object location.

8. A computing device, comprising:
a processor;
a memory having computer-executable instructions stored thereupon which, when executed by the processor, cause the computing device to
receive session data defining a virtual reality environment comprising a participant object, the session data allowing a participant to provide a participant input for controlling a location of the participant object and a direction of the participant object,
analyze the session data to determine a level of activity associated with the participant object and a type of activity associated with the participant object;
determine a level of activity associated with one or more virtual objects,
select a location and a direction of a virtual camera perspective based on the type of activity associated with the participant object, wherein the virtual camera perspective is a first-person perspective projecting from the location of the participant object, wherein the direction is towards the one or more virtual objects when the level of activity of one or more virtual objects is greater than the activity level of the participant object; and
generate an output file comprising video data having images from the location and direction of the virtual camera perspective, wherein the output file further comprises audio data for causing an output device to emanate an audio output from a speaker object location that is selected based on the location of the virtual camera perspective, wherein the audio output emanating from the speaker object location models the location and direction of the virtual camera perspective.

9. The computing device of claim 8, wherein the location of the virtual camera perspective is within a threshold distance from a path of the participant object.

10. The computing device of claim 8, wherein the virtual camera perspective is the first-person perspective projecting from the location of the participant object when a first type of activity is detected, wherein the virtual camera perspective is a third-person perspective directed toward the participant object when a second type of activity is detected.

11. The computing device of claim 10, wherein the second type of activity comprises a threshold level of activity of a virtual reality object and the participant object, wherein the virtual camera perspective causes the generation of the video data depicting the virtual reality object and the participant object.

12. The computing device of claim 10, wherein the first type of activity comprises movement of the participant object in a predetermined direction.

13. The computing device of claim 12, wherein the predetermined direction is at least one of a forward direction or a backward direction.

14. The computing device of claim 8, wherein the virtual camera perspective toggles between a first-person perspective and a third-person perspective based on one or more time periods.

15. The computing device of claim 8, wherein generating the audio output comprises configuring an audio signal to the output device in accordance with an Ambisonics-based technology, wherein the output signal defines at least one sound field modeling the location of an audio object associated with a stream, wherein data defining the sound field can be interpreted by one or more computing devices for causing the output device to emanate the audio output based on the stream from the speaker object location.

16. A method comprising:
receiving session data defining a virtual reality environment comprising a participant object, the session data allowing a participant to provide a participant input for controlling a location of the participant object and a direction of the participant object,
analyzing the session data to determine a level of activity and an activity type associated with the participant object;
determining a level of activity associated with one or more virtual objects,
selecting a location and a direction of a virtual camera perspective based on the level of activity and the activity type associated with the participant object, wherein the virtual camera perspective is a first-person perspective projecting from the location of the participant object when the level of activity of one or more virtual objects within the first-person perspective is greater than the activity level of the participant object; and
generating an output file comprising video data having images from the location and direction of the virtual camera perspective, wherein the output file further comprises audio data for causing an output device to emanate an audio output from a speaker object location that is selected based on the location of the virtual camera perspective, wherein the audio output emanating from the speaker object location models the location and direction of the virtual camera perspective.

17. The method of claim 16, wherein the location of the virtual camera perspective is within a threshold distance from a path of the participant object.

18. The method of claim 16, wherein the virtual camera perspective is a first-person perspective projecting from the location of the participant object when the one or more virtual objects within the first-person perspective have a threshold level of activity.

19. The method of claim 16, wherein the virtual camera perspective is a third-person perspective directed toward the participant object and the one or more virtual objects when the participant object has a threshold level of activity with the one or more virtual objects.

* * * * *